US 8,512,556 B2

(12) United States Patent
Duran et al.

(10) Patent No.: US 8,512,556 B2
(45) Date of Patent: Aug. 20, 2013

(54) WATER RESISTANT HATCH AND HOOD

(75) Inventors: Lee A. Duran, Lyme, CT (US); Thomas J. Mullen, III, Middle River, MD (US)

(73) Assignee: Best Management Products, Inc., Lyme, CT (US)

( * ) Notice: Subject to any disclaimer, the term of this patent is extended or adjusted under 35 U.S.C. 154(b) by 276 days.

(21) Appl. No.: 13/112,795

(22) Filed: May 20, 2011

(65) Prior Publication Data

US 2011/0315617 A1 Dec. 29, 2011

Related U.S. Application Data

(60) Provisional application No. 61/346,745, filed on May 20, 2010.

(51) Int. Cl.
| E03F 5/16 | (2006.01) |
| B01D 17/025 | (2006.01) |
| B01D 21/24 | (2006.01) |
| B01D 17/02 | (2006.01) |

(52) U.S. Cl.
CPC .............. *E03F 5/16* (2013.01); *B01D 17/0208* (2013.01); *B01D 21/2444* (2013.01)
USPC ............... 210/170.03; 210/532.1; 210/538; 404/2

(58) Field of Classification Search
USPC ................. 210/162, 163, 164, 170.03, 532.1, 210/532.2, 538, 540; 404/2, 4, 5
See application file for complete search history.

(56) References Cited

U.S. PATENT DOCUMENTS

| 140,145 | A | | 6/1873 | Ledbeter | |
|---|---|---|---|---|---|
| 170,660 | A | * | 12/1875 | Brady et al. | 210/538 |
| 1,005,371 | A | * | 10/1911 | McConnell | 404/4 |
| 1,401,182 | A | | 12/1921 | Overton | |
| 1,634,871 | A | | 7/1927 | Hepler | |
| 1,758,318 | A | * | 5/1930 | Hayley | 210/538 |
| 1,769,340 | A | | 7/1930 | Gutman et al. | |
| 4,334,991 | A | | 6/1982 | Beede | |
| 4,985,148 | A | | 1/1991 | Monteith | |
| 6,074,130 | A | * | 6/2000 | Duran | 404/2 |
| 6,126,817 | A | | 10/2000 | Duran et al. | |
| 6,132,603 | A | * | 10/2000 | Mokrzycki et al. | 210/170.03 |
| 6,350,374 | B1 | | 2/2002 | Stever et al. | |
| 7,686,961 | B1 | * | 3/2010 | Glynne | 210/532.1 |
| 7,857,966 | B2 | * | 12/2010 | Duran et al. | 210/170.03 |
| 7,951,294 | B2 | * | 5/2011 | Duran et al. | 210/170.03 |

* cited by examiner

*Primary Examiner* — Christopher Upton
(74) *Attorney, Agent, or Firm* — St. Onge Steward Johnston & Reens LLC

(57) ABSTRACT

A hood that mounts around an outlet of a catch basin with a cover having a proximal end and distal end; the proximal end being pivotally attached to the hood. The cover pivots between a closed sealed position that substantially prevents water born contaminants from passing through the access opening and an open position that allows access to the access opening. The cover is made from a flexible material to allow the cover to be lifted from the closed sealed position in a substantially vertical path that allows access to the outlet of a catch basin.

21 Claims, 5 Drawing Sheets

WATER RESISTANT HATCH AND HOOD

CROSS-REFERENCE TO RELATED APPLICATIONS

The present application claims the benefit under 35 U.S.C. §119(e) of U.S. Provisional Patent Application Ser. No. 61/346,745 filed on May 20, 2010.

FIELD OF THE INVENTION

The present invention relates to the field of wastewater management. More particularly, the present invention relates to a low cost and effective hood for controlling and reducing the flow of pollutants and solids into an outlet of a catch basin that allows a person to easily install the hood and more easily remove any obstacles that may be trapped by the hood during maintenance of the catch basin and the outlet.

BACKGROUND OF THE INVENTION

Stormwater runoff is characterized by the United States Environmental Protection Agency as one of the greatest remaining sources of water pollution in America. Thus, efforts to implement stormwater quality improvement regulations are accelerating across the United States, compelling municipalities and land developers to maximize the usefulness and effectiveness of stormwater infrastructure as never before.

In urban, suburban, and commercial settings, polluted stormwater, also referred to as wastewater, is often collected in a catch basin, also referred to as a wastewater basin. In its simplest form, a catch basin functions to intercept surface water flows in order to prevent the accumulation of stormwater in an area where flooding could impede traffic or pedestrians, cause property damage, or otherwise present a nuisance. Stormwater collects in the catch basins, and flows through a network of pipes, sewers, and additional catch basins to an outlet point such as a lake, stream, river, ocean, unpopulated area, or similar location where the wastewater may be dispersed without the threat of flood or property damage. However, catch basins are also often the entry point of pollutants from diffuse sources found in stormwater runoff. For example stormwater runoff may contain pollutants such as hydrocarbons (also referred to as "oil"), bacteria, sediment, trash, organic material such as leaves, grass clippings, particulate, soil, detergents, coolants, grease, fertilizer, paint, and feces. As a result, polluted wastewater is often discharged, untreated, directly into lakes, streams, and oceans.

Prior art hoods include cast iron hoods sealably mounted to the walls of catch basins. These systems are based on the principle of differential specific gravity separation. The liquid mixture, which usually is wastewater, flows slowly through an elongated path in a liquid-retaining structure, such as, for example, a catch basin. The matter to be collected is usually oil and floatable debris and other types of surface debris which accumulate on the surface of the wastewater because they have a specific gravity lower than that of water. Alternatively, as the wastewater flows through the catch basin solids carried by the wastewater accumulate on the bottom of the basin. These solids sink to the bottom of the catch basin because they have a specific gravity greater than water. The problem with these catch basins is that debris and trash may collect inside of the outlet pipe and in the interior of the hood. To remove any debris, or to perform maintenance on the outlet pipe, the hood has to be completely removed, unsealing the hood from the wall, to gain access to the interior of the hood and the outlet pipe.

To overcome this problem, and to gain access to the interior of the hood and the outlet pipe, a cast iron hatch was hingedly attached to the wall of the catch basin. The hood could be lifted up to allow access to the interior of the hood. These hoods had many disadvantages. First, the hoods were not sealably mounted to the wall of the catch basin, allowing a significant amount of debris to flow beyond the hood. Second, the hoods were very heavy to lift up as they had to be made of cast iron.

To overcome the problems with previous hoods, hoods composed of a material other than cast iron were designed with a port hole-like opening at the top. In reference to FIG. 1, a known outlet hood 10 with this design is shown. The hood 10 is installed to the wall 20 of a catch basin over an outlet pipe 30 in the wall 20 of the catch basin. The outlet pipe 30 is shown with hidden lines and its distal end appears to protrude slightly from the wall 20 of the catch basin.

The hood 10 further includes a porthole 40 to allow access to the interior of the hood. A maintenance worker must climb down into the catch basin and open the porthole by manually unscrewing a cover, revealing an opening into the hood 10. The maintenance worker then, either manually or with a suction mechanism, can remove any debris that may have collected inside of the hood or perform maintenance and service on the outlet pipe.

A disadvantage of this hood is that a maintenance worker needs to enter the catch basin in order to remove the cover of the porthole and remove any debris that may have entered the hood. This requires the maintenance worker to wear protective gear to protect the worker from the water-born toxins and other pollutants in the catch basin. Having to wear protective gear, and the need to enter the catch basin, increases the amount of time needed to access the inside of the hood, which adds a significant amount of time to perform maintenance or service on multiple catch basins. Additionally, having to enter the catch basin exposes the maintenance worker to harmful gases, material, and debris. This can affect the health of the worker, and increase the health care costs associated with this profession.

Another disadvantage is the hood requires a mechanical mechanism to seal the porthole. Mechanisms such as threads and cam-locks, which are used in this type of hood, are more susceptible to failure in that they may be difficult to open and close even if the person is in the catch basin. In order to have an effective seal to prevent surface debris, such as oil, from passing through the port hole, the prior art covers needed screwed thread connections that need manual tightening to be effective. This requires substantial time and effort by the maintenance worker. Water, sediment, and harsh materials may impact the performance of a traditional mechanism used to seal the porthole, which may prevent access the porthole as the cover may be stuck.

Another disadvantage of this hood is that it can only be installed in catch basins with enough room for a maintenance worker to enter the catch basin. The catch basin must be sufficiently large for the hood plus a maintenance worker, and requires enough height clearance for the cover of the porthole to be completely removed. The confined space entry in these smaller catch basins can create dangerous conditions for maintenance workers who need to enter the basin to perform maintenance activity. These catch basins cannot be installed in small catch basins, such as basins sized at 18 inches.

What is desired therefore is an apparatus for reducing the flow of pollutants such as hydrocarbons, sediment, soil, trash, and floatables into the outlet of a catch basin. Another desire is for an apparatus that does not require a person to enter the catch basin in order to clean out any debris that may have entered the hood or access the opening. Another desire of this apparatus is to limit the number of components to prevent the failure of the apparatus. Another desire is an apparatus that is modular to allow the hood to be easily installed in catch basins that may only have a small opening in the ground from which water flows into. Another desire is an apparatus that can be used in small catch basins that are not large enough for a person to enter. It is also desirable to have a partially liftable and flexible hatch that would permit access to the outlet pipe to perform things such as pipeline surveillance and root scouring.

SUMMARY OF THE INVENTION

The invention is directed to a hood covering in a catch basin having an easy access hatch. The easy access hatch allows easy access to the interior of the hood without requiring the maintenance worker to don protective gear or enter the confined area of a catch basin.

These and other objects of the present invention are achieved by provision of an apparatus for mounting around an outlet of a catch basin comprising a hood having an upper portion and a lower portion, the upper portion of the hood having an access port or opening. The cover has a proximal end and distal end, the proximal end is pivotally attached to the upper portion of the hood and the cover is pivotal between a closed substantially sealed position that prevents surface debris and other water-born contaminants from passing through the access opening and an open position that allows access to the access opening. The cover is made of a flexible material to allow the distal end of the cover to be lifted from the closed sealed position in a substantially vertical path by a substantially vertically lifting force. Typically this can be done using a pole or handle extended down into a catch basin to pull up on the hood.

In some embodiments, a handles extends from the cover. In some embodiments, the cover is substantially an elastomer material. In some embodiments, the cover, in a closed position, creates a sealing area around the access port where the cover is in contact with the hood around the periphery of the access port. In some embodiments, the upper portion of the hood is substantially flat. In some embodiments, the cover is in a substantially parallel plane with the upper portion. In some embodiments, the access port has a downwardly facing molding around its perimeter.

In another embodiment of the present invention is an apparatus for mounting around an outlet of a catch basin comprising a hood adapted to be partially sealingly fitted around the outlet of a wall of the catch basin so as to define at least a partially sealable compartment therewith that is open to the outlet and extends below the outlet. A hatch made from an elastomeric material is attached at a first end to a top portion of the hood and covers an access opening in the top portion, the hatch releasably seals the access opening in the top portion. A handle with a hook is attached to a second end of the hatch, the second end being opposite the first end.

In some embodiments, the hood comprises two pieces that are sealed together during installation of the hood. In some embodiments, in a closed position, the hood and the hatch are sealingly fitted together. In some embodiments, the hatch is weighted and releasably seals the access opening using the weight of the hatch. In some embodiments, the hatch is substantially triangularly shaped. In some embodiments, the second end is an apex of the triangle.

In another embodiment of the present invention is an apparatus for mounting around an outlet of a catch basin comprising a hood having a top portion and a bottom portion, the hood adapted to be partially sealingly fitted around the outlet of a wall of the catch basin so as to define at least a partially sealable compartment therewith that is open to the outlet and extends below the outlet and an elastomeric hatch attached to the top portion of the hood.

In some embodiments, the hatch is weighted and releasably seals an access opening in the top portion using the weight of the hatch. In some embodiments, the hatch has a weighted handle. In some embodiments, the hood comprises a bottom portion having a first flange and a top portion having a second flange adapted to be sealingly fitted with the first flange. In some embodiments, the bottom portion is sealed to the top portion using a gasket. In some embodiments, an adhesive is applied to the gasket.

In another embodiment of the present invention is an apparatus for mounting around an outlet of a catch basin comprising a hood wall adapted to be partially sealingly fitted around the outlet of a wall of the catch basin so as to define at least a partially sealable compartment therewith that is open to the outlet and extends below the outlet. The hood wall comprises a bottom portion having a first flange and a top portion having a second flange adapted to be sealingly fitted with the first flange. A substantially triangularly shaped weighted hatch made from an elastomeric material is attached to the top portion and covers an access port in the top portion. The weighted hatch releasably seals the access port.

In some embodiments, a weighted handle extends from the hatch and has a hook. In some embodiments, the top portion of the hood is substantially flat. In some embodiments, the hatch is in a substantially parallel plane with the access port. In some embodiments, the access opening has a downwardly facing molding around its perimeter.

DETAILED DESCRIPTION OF THE INVENTION

Figure 1:
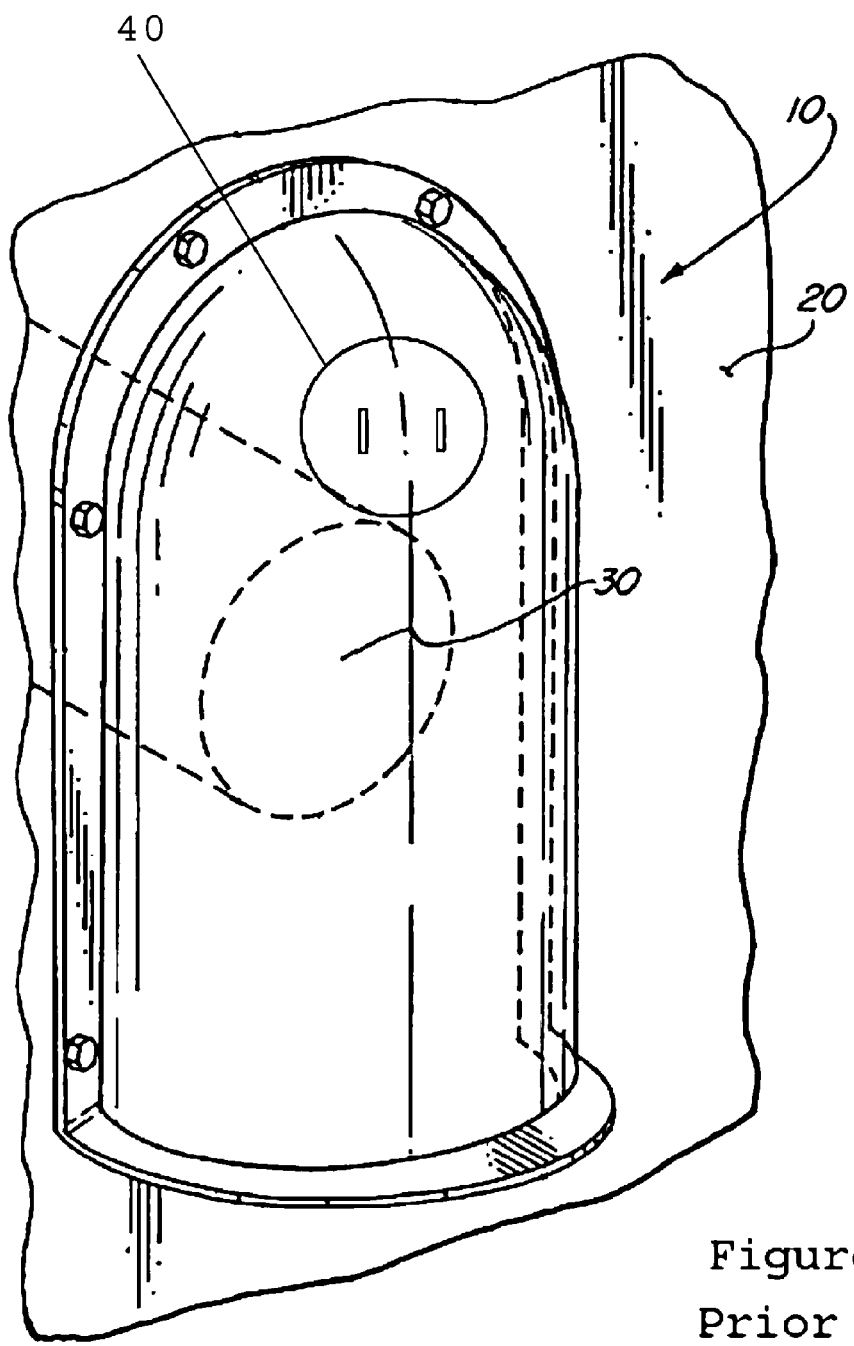
FIG. 1 is a perspective view of a catch basin wall, wherein a known hood design having a front wall in the horizontal plane with a constant radius having a circular access point sealed with a screwed cover.

The exemplary embodiments of the present invention may be further understood with reference to the following description and the related appended drawings, wherein like elements are provided with the same reference numerals. The exemplary embodiments of the present invention are related to an apparatus for controlling and reducing the flow of pollutants and solids into an outlet of a catch basin that allows a person to easily install the device and remove any debris within the hood during maintenance. Specifically, the apparatus uses a hood sealably attached to the wall of a catch basin, and a novel hatch or cover system, allow easy access to the access port in the hood.

Figure 2:
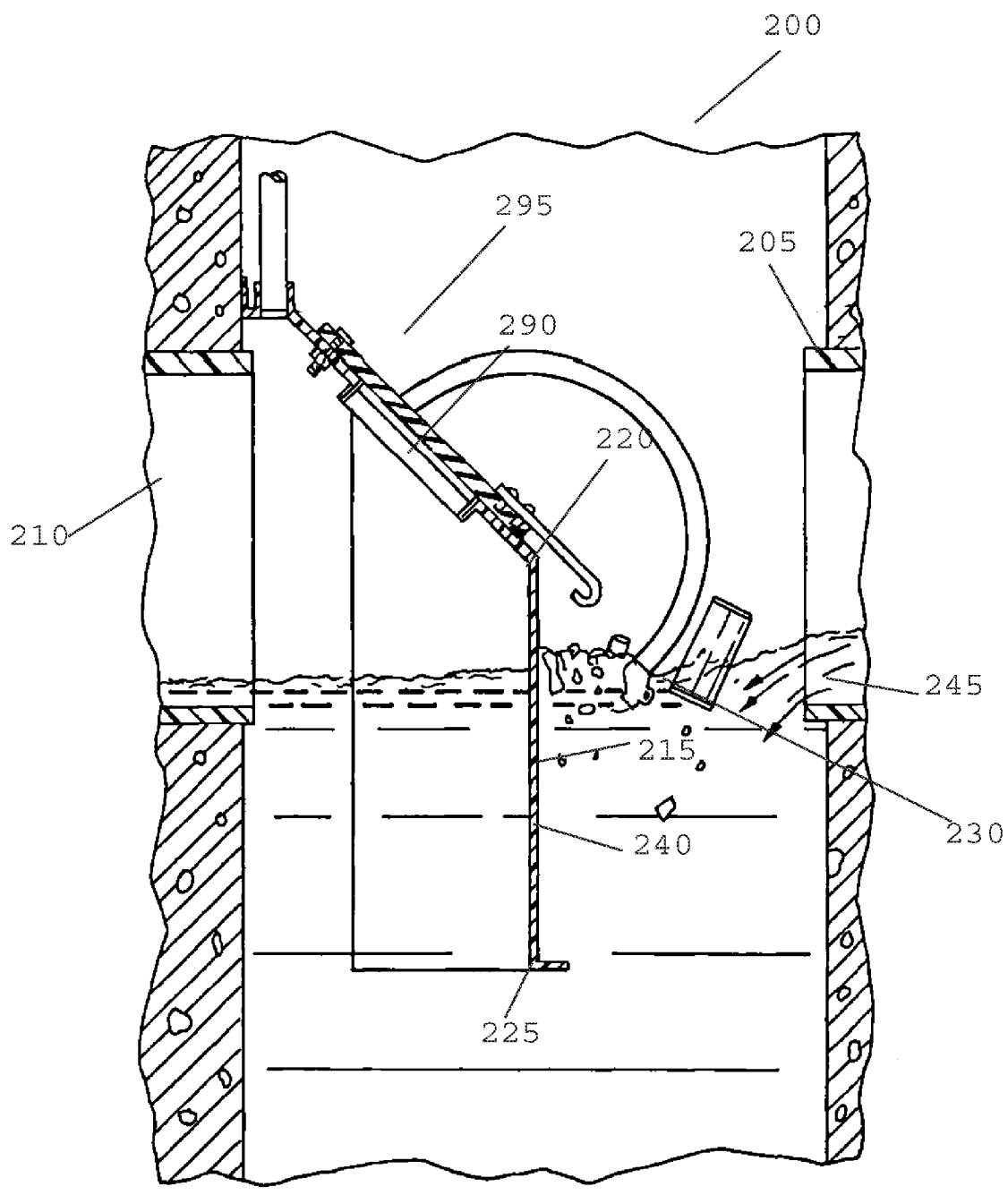
FIG. 2 is a side view of a hood according to one embodiment of the present invention.
Figure 3:
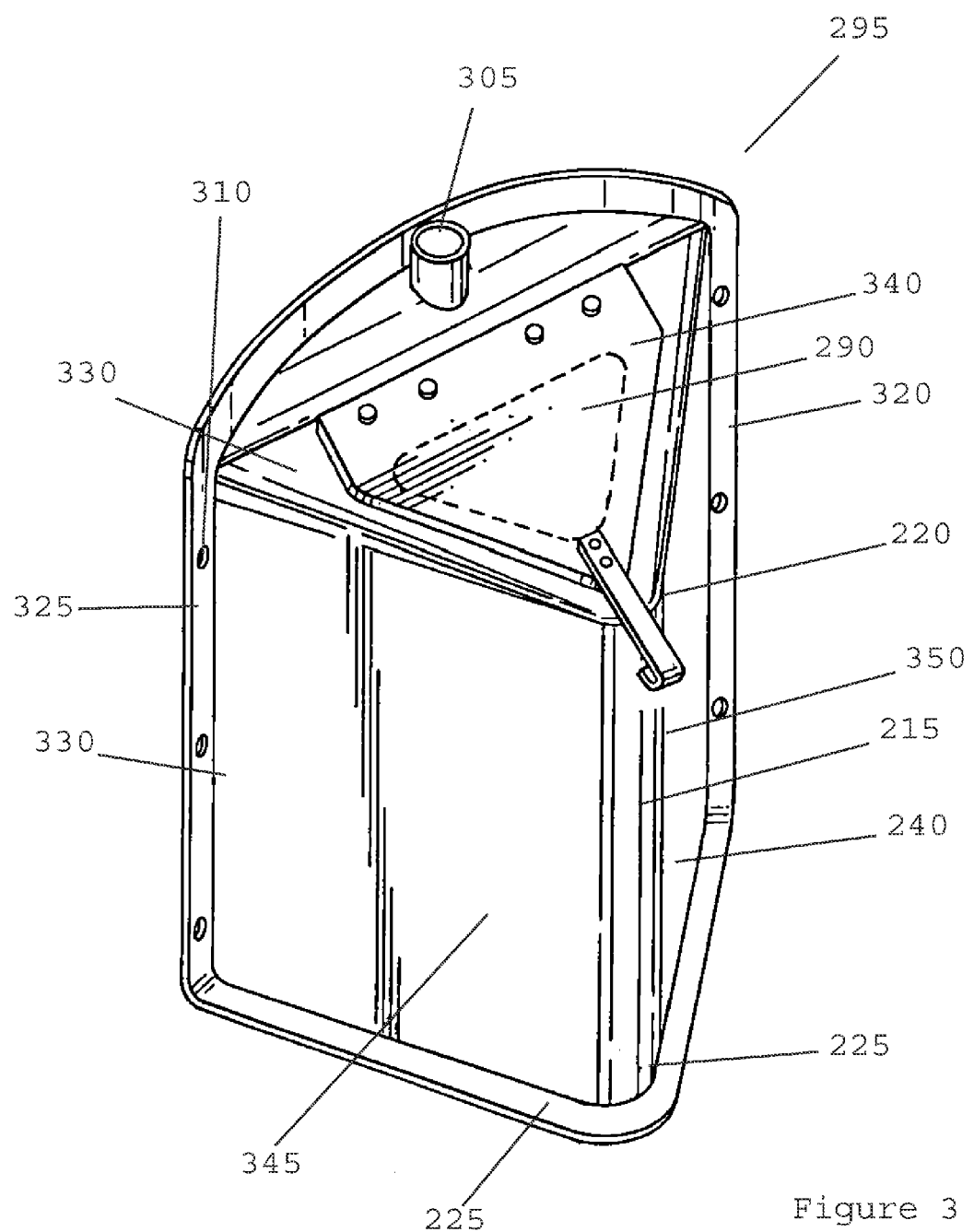
FIG. 3 is a perspective view of the hood shown in FIG. 2.
Figure 4:
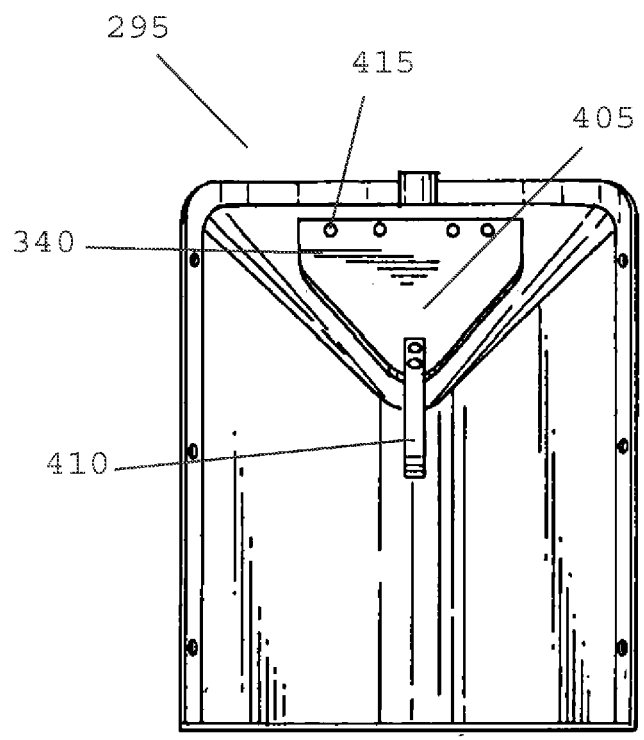
FIG. 4 is a front view of the hood shown in FIG. 3.

As best seen in FIG. 2, a vertical cross section of the circular catch basin 200 is shown. In this catch basin 200, the first inlet pipe 205 enters catch basin 200 at the same vertical level as the outlet pipe 210. In some embodiments the first inlet pipe 205 may be above the outlet pipe 210 thereby preventing wastewater from backing up in the inlet pipe 205. The prow 215 extends toward the middle of the catch basin in the horizontal plane. In some embodiments the prow extends to a center point of the catch basin in a cross section plane defined by the static waterline. This provides sufficient room inside the hood compartment to allow the hood to accommodate different size outlets, while also providing sufficient room outside the hood compartment for pollutants to collect on the surface of the wastewater.

As best seen in FIGS. 3-6, perspective, front, and side views of the hood from FIG. 2 are shown. Hood wall 240 comprises a left side 345 and right side 350. A flange 325 extends along a least a portion of the perimeter of the left side 345 and right side 350. The flange 325 provides a surface to sealably mount the hood 295 to the wall of the catch basin 200. The flange 325 may include one or more holes 310 for sealably mounting the hood 295 to the wall. It should be understood that any system may be used to sealably mount the hood 295 to the wall of a catch basin 200. For example, cement, sealant, external fixtures, or bolts may be used to sealably mount the hood 295 to the wall of the catch basin 200.

Hood wall 240 may form a prow 215 in the horizontal plane defined by the static water level 230 (FIG. 2) in the catch basin 200. Again, the static water level 230 is the lowest point of the outlet pipe. In other words, the hood wall 240 forms a wedge in the horizontal plane, when the hood 295 is mounted to the wall. In some embodiments the prow 215 extends along a vertical axis. The prow 215 extends between the hood wall bottom 225 and a hood wall top 220. In the disclosed embodiment the bottom of the prow 215 is below the static water level 230, and the top of the prow 215 is above the static waterline 230. In the embodiment shown the bottom of the prow 215 extends to the bottom 225 of the hood wall 240, and the top of the prow 215 extends to the top 220 of the hood wall 240.

In a preferred embodiment, the top of hood 295 is substantially flat. A substantially flat top portion, including the access port. Because the access port and upper portion of the hood is flat it allows for a superior seal in conjunction with the hatch design which creates a sealing surface area adjacent to the perimeter of the access port.

Hood 295 has an access opening or port 290 that allows access into the interior of hood 295. Through access opening 290 a maintenance worker can perform maintenance and service on the outlet pipe, or remove any debris that may have collected inside of hood 295 or in the outlet pipe. Hood 295 has a hatch or cover 340. Hatch 340 is preferably shaped similar to the shape of the top of hood 295. For example, if the top of the hood 295 is triangular in shape, hatch 295 would also be triangular in shape. It should be noted, that the shape of hatch 340 does not need to be the same shape as the top of hood 295. Hatch 340 includes a cover portion 405 and a handle 410. Cover portion 405 is preferably sized larger than access opening 290 being covered by hatch 340 to increase the durability of the seal created by the hatch. Having a cover portion sized larger than the access opening 290 allows water that falls on hatch 340 to be deflected into the catch basin and helps prevent any leakage in the access opening 290 of hood 295. In a preferred embodiment, the cover extends beyond the access opening 290 by at least 1 inch.

Access opening 290 can be of any size depending on the size of hood 295 and size of catch basin 200. Access opening 290 preferably has a downwardly facing molding around it to increase the support in the top of hood 295. This additional support of the molding reduces the overall number of components necessary to bear the weight of hatch 340.

Figure 5:
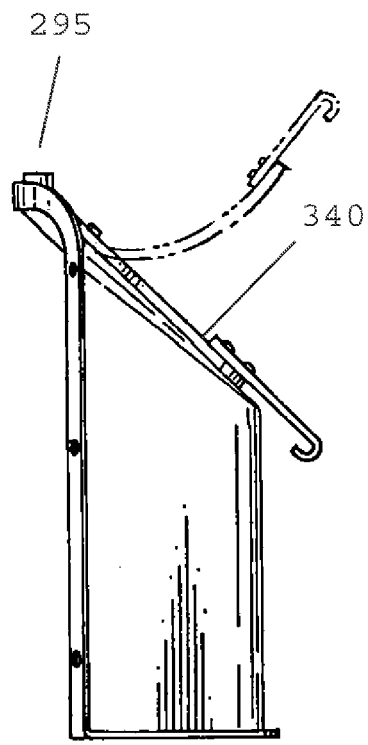
FIG. 5 is a side view of the hood shown in FIG. 2.
Figure 6:
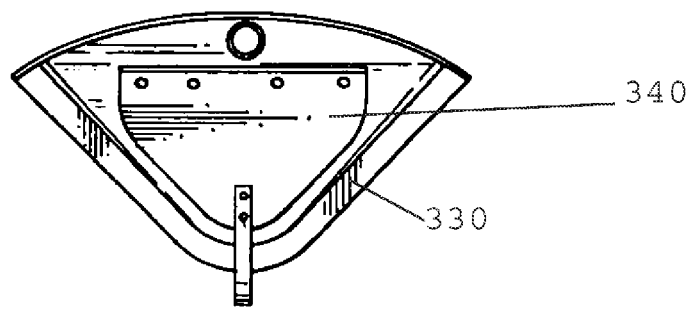
FIG. 6 is a top view of the hood shown in FIG. 2.

Hatch 340 is pivotally secured directly to hood 295 at a top portion and extends over access opening 290. Hatch 340 may include a hinge or other mechanical connection with rotational abilities, however, it is preferable that a hatch 340 is connected directly to hood 295, without any intermediate mechanical means, and hatch 340 allows access to the interior of hood 295 by bending in an upward direction. As shown in one embodiment in FIG. 4, the hatch is fastened to the hood with fasteners 415. In a preferred embodiment (As shown in FIG. 5), hatch 340 is capable is bending in an upward direction with a decreasing radius, allowing access to the interior of hood 295 without having to completely open hatch 340. In contrast, when opening a rigid hatch the outer edge would be required to follow a constant radius the length of the hatch, and would require a catch basin with a larger height and width to open sufficiently to gain access to the interior of the hood.

Preferably, Hatch 340 is made from an elastomeric material such as rubber. An elastomeric material, such as rubber, allows hatch 340 to be bent upward to allow access to the interior of hood 295 while still maintaining it shape when in a resting position. Hatch 340 is of a sufficiently heavy material to sit flat against the top surface of the upper hood in the closed position. The weight of hatch 340, in addition to the weight of handle 410 (as described below) creates a seal between hatch 340 and hood 295. It is preferable that the seal is watertight, however, a watertight seal is not necessary and any seal that protects against oil, contaminates, and other debris, may be sufficient. In a preferred embodiment, hatch 340 is flat, and is planar or in a substantially parallel plane with the top of hood 295. A flat hatch allows for a better seal against the top of hood 295. As shown in the embodiment of FIG. 2, the hatch (or cover), when in a closed position, lies in a plane parallel to the flat surface of the upper hood.

Hatch 340 has a handle 410 sized particularly large to generate a larger force around the connection between hatch 340 and hood 295 without requiring great strength to open hatch 340. Handle 410 may also have a hook to allow an extension device, such as a grab hook or a boat hook, to be inserted into the catch basin, grabbing the hook of handle 410, and lifting hatch 340. This negates the need for a person to reach into the catch basin to open hatch 340. Handle 410 is preferably made from a weighted material, such as 10 gauge steel. The weight of handle 410 creates a superior seal as a large amount of weight is placed at the tip of hatch 340. This generates a large downward force on hood 295 by hatch 340, enhancing the seal between hatch 340 and hood 295 in the sealing area. Hood 295 is not limited to hoods with an extending hook or handle, but would include hatches that incorporate lifting elements into the hatch that would permit a grab hook to grab onto to lift the hatch.

In another embodiment, hatch 340 may have a plurality of magnets embedded around the perimeter of the hatch. Hood 295 may have magnets on the top of the hood, corresponding to the magnets in hatch 340. The addition of magnets creates an additional sealing force between hatch 340 and hood 295 without requiring any additional mechanical components. This increases the effectiveness of the seal without decreasing the durability of hatch 340.

To gain access to hatch 340, a maintenance worker reaches down into catch basin 200 and grabs handle 410, or a device is inserted into the catch basin to grab the hook. The maintenance worker lifts up handle 410, which can be lifted in a substantially vertical direction, revealing access opening 290 in hood 295. In contrast, a rigid hatch structure would require the maintenance worker to lift the hatch following the fixed radius path followed by the outer edge of the rigid hatch. This makes a rigid hatch more difficult to open, and requires more space. This can be problematic especially in smaller catch basins. Once the hatch is lifted, the maintenance worker can then remove any debris that may be inside of hood 295 either by hand or using a vacuum. The invention also allows for partial lifting of the hatch too. The new design of hatch 340, compared to FIG. 1, allows access to the interior of hatch 295 without requiring a person to don protective gear and enter catch basin 200. This saves a significant amount of time in the cleaning of each catch basin and also significantly reduces any health risks associated with the cleaning of catch basins as a person is no longer directly exposed to the waste in the catch basin.

In the exemplary embodiments, hatch 340 is shown to be triangular in shape, shaped similar to hood 295. However, hood 295 need not be shaped triangularly with a prow as a point. Hood 295 may be rounded in shape, or of any other shape that may facilitate the protection of stormwater in a catch basin. Hatch 340 may be redesigned to be shaped similar to hood 295. And may be rounded or of any other known type of shape.

Figure 7:
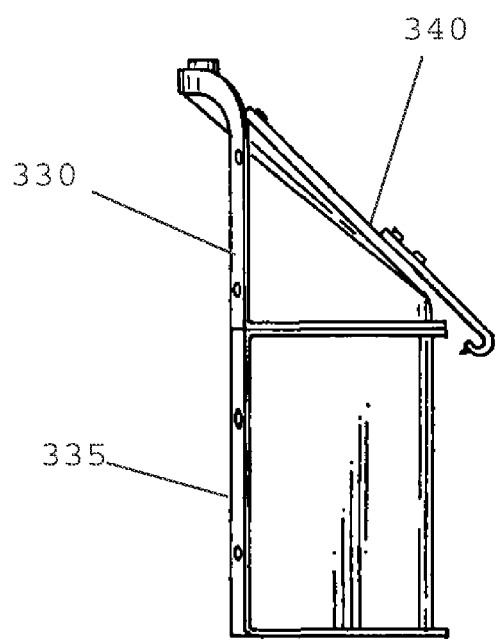
FIG. 7 is a side view of a hood according to another embodiment of the present invention.
Figure 8:
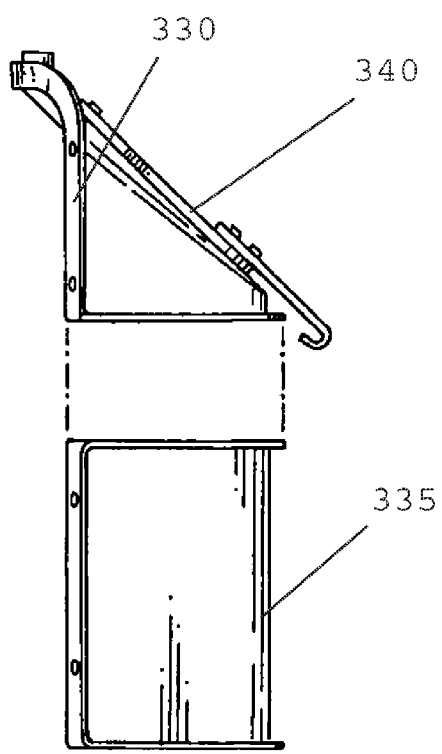
FIG. 8 is an exploded side view of a hood according to FIG. 7.

As best seen in FIGS. 7 and 8, side views of a second embodiment of hood 295 are shown. Hood 295 has a top portion 330 and a bottom portion 335. Hood 295 may be of a unibody construction (FIGS. 2-5), being made from a single piece of plastic, metal, or any other known material. In another embodiment, hood 295 may be modular. Hood 295 may be composed of two separate pieces, top portion 330 and bottom portion 335. Top portion 330 and bottom portion 335 may be constructed separately but designed to sealingly fit together such that no water can penetrate the side of hood 295. Top portion 330 and bottom portion 335 may be sealed together using a gasket to provide a water tight seal, and an adhesive that adheres top portion 330 to bottom portion 335. Top portion 330 may not be adhered directly to bottom portion 335; and only a gasket may be used. Top portion 330 and bottom portion 335 may be separately sealed to the wall of the catch basin. Each portion may have a flange with a gasket that allows for an overlapping portion between top portion 330 and bottom portion 335. The sealing of both portions to the wall creates a sealing force in the gasket, creating a water tight seal. The bottom of top portion 330 may be sized slightly larger than the top of bottom portion 335. This allows top portion 330 to fit around bottom portion 335 to create the seal. In a further embodiment, the top of bottom portion 335 may be sized slightly larger than the bottom of top portion 330 to create the seal.

This apparatus has the advantage in that it can be installed in many locations due to its modularity. The apparatus is small and can be installed in catch basins as small as 18 inches, or catch basins that are traditionally difficult for a person to enter. The apparatus doesn't require a hinge or a traditional mechanism to allow access to the interior of the hood; this increases the lifespan of the hood and prevents many defects. Additionally, the hatch does not need to be opened all of the way to allow access to the interior. This limits the necessary clearance in height required to open a traditional hood.

The apparatus also protects a person from having to enter the catch basin in order to remove any debris that may have entered the outlet pipe, to inspect the outlet pipe, or to perform maintenance on the outlet pipe or the interior of the hood. This protects the person from potential diseases, contaminants, or sharp or hard objects that may be lurking inside of the murky water of the catch basin. This provides a large cost savings as specialty protection gear is not required, health care costs can be reduced as the person cleaning the catch basin does not need to be exposed to the contaminated water, and the amount of time necessary to clean each catch basin is reduced.

It would be appreciated by those skilled in the art that various changes and modification can be made to the illustrated embodiment without departing from the spirit of the invention. All such modification and changes are intended to be covered hereby.

What is claimed is:

1. An apparatus for mounting around an outlet of a catch basin comprising:
   a hood having an upper portion and a lower portion, said upper portion of said hood having an access opening;
   a cover having a proximal end and distal end, said proximal end being pivotally attached to said upper portion of said hood, said cover being pivotal between a closed substantially sealed position that prevents surface debris from passing through said access opening and an open position that allows access to said access opening;
   said cover being of a flexible material to allow said distal end of said cover to be lifted from the closed sealed position in a substantially vertical path by a substantially vertically lifting force.

2. The apparatus of claim 1 wherein a handles extends from said cover.

3. The apparatus of claim 1 wherein the cover is substantially an elastomer material.

4. The apparatus of claim 1 wherein said cover, in a closed position, creates a sealing area around said access port where said cover is in contact with said hood around the periphery of said access port.

5. The apparatus of claim 1, wherein said upper portion of said hood is substantially flat.

6. The apparatus of claim 5, wherein said cover is in a substantially parallel plane with said upper portion.

7. The apparatus of claim 1, wherein said access port has a downwardly facing molding around its perimeter.

8. An apparatus for mounting around an outlet of a catch basin comprising:
   a hood adapted to be partially sealingly fitted around the outlet of a wall of the catch basin so as to define at least a partially sealable compartment therewith that is open to the outlet and extends below the outlet;
   a hatch made from an elastomeric material attached at a first end to a top portion of said hood and covering an access opening in said top portion, said hatch releasably sealing said access opening in said top portion;
   a handle with a hook attached to a second end of said hatch, said second end being opposite said first end.

9. The apparatus of claim 8, wherein said hood comprises two pieces that are sealed together during installation of said hood.

10. The apparatus of claim 9, wherein in a closed position, said hood and said hatch are sealingly fitted together.

11. The apparatus of claim 9, wherein said hatch is weighted and releasably seals said access opening using the weight of said hatch.

12. The apparatus of claim 8, wherein said hatch is substantially triangularly shaped.

13. The apparatus of claim 12, wherein said second end is an apex of said triangle.

14. An apparatus for mounting around an outlet of a catch basin comprising:
   a hood having a top portion an a bottom portion, said hood adapted to be partially sealingly fitted around the outlet of wall of the catch basin so as to define at least a partially sealable compartment therewith that is open to the outlet and extends below the outlet; and an elastomeric hatch attached to said top portion of said hood.

15. The apparatus of claim 14, wherein said hatch is weighted and releasably seals an access opening in said top portion using said weight.

16. The apparatus of claim 14, wherein said hatch has a weighted handle.

17. The apparatus of claim 14, wherein said hood comprises a bottom portion having a first flange and a top portion having a second flange adapted to be sealingly fitted with said first flange.

18. The apparatus of claim 17, wherein said bottom portion is sealed to said top portion using a gasket.

19. The apparatus of claim 18, wherein an adhesive is applied to said gasket.

20. An apparatus for mounting around an outlet of a catch basin comprising:

a hood wall adapted to be partially sealingly fitted around the outlet of a wall of the catch basin so as to define at least a partially sealable compartment therewith that is open to the outlet and extends below the outlet, said hood wall comprising:

a bottom portion having a first flange;

a top portion having a second flange adapted to be sealingly fitted with said first flange;

a substantially triangularly shaped weighted hatch made from an elastomeric material attached to said top portion and covering an access port in said top portion, said weighted hatch releasably sealing said access port.

21. The apparatus of claim 20, wherein said hatch is in a substantially parallel plane with said access port.

* * * * *